(No Model.)
E. W. & J. W. McLENDON
SEED PLANTER AND FERTILIZER DISTRIBUTER.
No. 322,306. Patented July 14, 1885.
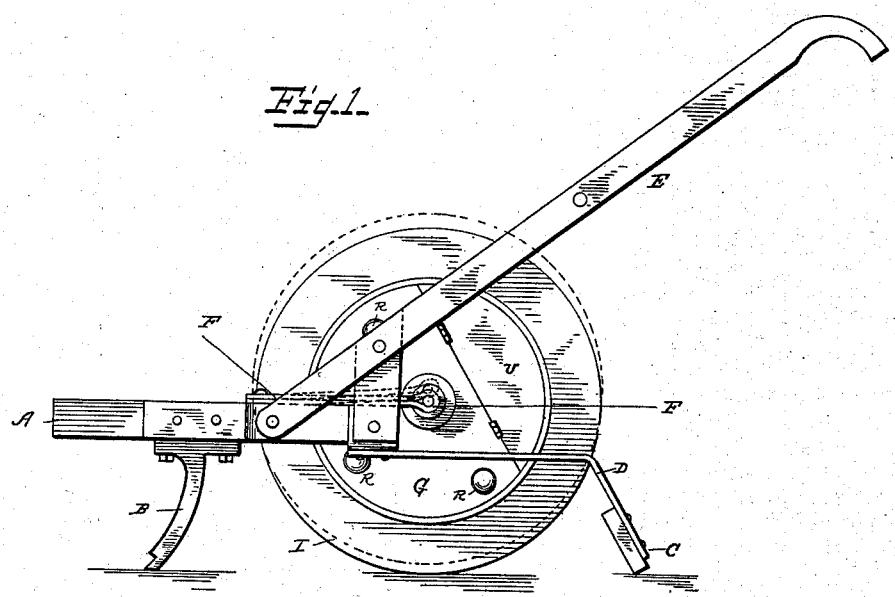
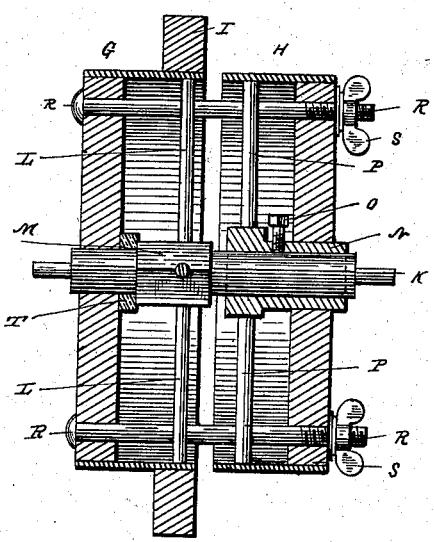
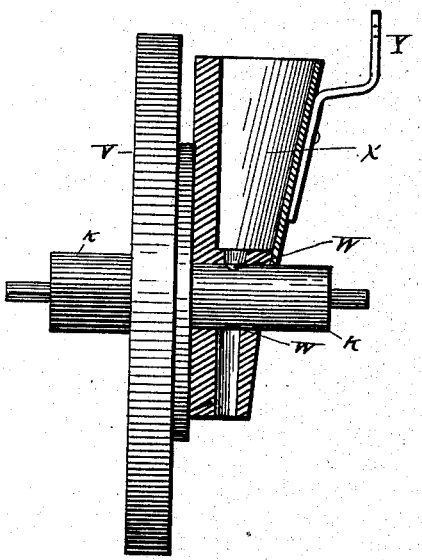

UNITED STATES PATENT OFFICE.

ELIJAH W. McLENDON AND JOSEPH W. McLENDON, OF MARTIN'S STATION, ALABAMA.

SEED-PLANTER AND FERTILIZER-DISTRIBUTER.

SPECIFICATION forming part of Letters Patent No. 322,306, dated July 14, 1885.

Application filed July 14, 1884. (No model.)

*To all whom it may concern:*

Be it known that we, ELIJAH W. MCLENDON and JOSEPH W. MCLENDON, citizens of the United States, residing at Martin's Station, in the county of Dallas and State of Alabama, have invented certain new and useful Improvements in Seed-Planters and Fertilizer-Distributers, of which the following is a specification, reference being had therein to the accompanying drawings.

Our invention relates to certain improvements in seeders and fertilizers, and is designed objectively to perform the various functions required in both seed-planting and fertilizer-distributing with equal success and completeness.

The improvements consist, essentially, in the spring adjustment of the roller relative to the frame and of the seed orifice of the said roller.

To describe the mechanism performing the functions set forth, reference is had to the annexed drawings, in which—

Figure 1 represents a side elevation of the device; Fig. 2, a vertical section through the roller hopper; and Fig. 3 a detail view, in elevation and section, of an additional roller and seed-hopper.

A frame, A, carries in front a plow or opener, B, and at the rear a coverer, C, held in place by spring-arms D, which allow it to easily pass over slight obstructions. A pair of handles, E, secured to the frame serve to aid in guiding the device properly. On each side of the frame, inside the handles, is secured a rearward-projecting spring-piece, F, having its free end formed into an eye, which serves as a bearing for the axle of the roller or hopper. This roller is composed of two cylinders, G and H, respectively, one, G, having a ring, I, secured to its periphery, and which comes in contact with the ground. The axle K passes through the center of the part G, and is secured thereto by radial arms L, projecting from the squared portion M of the axle. The other portion, H, of the roller has centrally secured to it a sleeve, N, through which the axle passes and is secured thereto by a set-screw, O. This sleeve is also provided with radial arms P, secured to the roller. The arms on both the axle and the sleeve serve the additional function of stirrers. The two parts of the roller are held together by bolts R, each having at one end a thumb-screw, S, for adjusting the width of the seed-orifice between the two parts of the roller. A spring, T, preferably rubber, is interposed between the squared portion of the axle and the side of the cylinder G, thus causing the two parts of the roller to spread apart as the thumb-screws are loosened, as is evident, the end of the axle passing loosely through the said side, and the radial arms being "springy" enough to allow the lateral movement. The spring-pieces F allow a certain upward motion of the roller, should the same come in contact with any obstruction. A door, U, is provided in the side of the roller for inserting the seed therein.

In Fig. 3 is shown a disk-roller, V, having its axle provided with a series of seed-cups, W, which operate in the seed-passage of a hopper, X, having a supporting-arm, Y, secured to the frame of the seeder. This roller is interchangeable with the one shown in Fig. 2, and is for planting peas and the like.

Having described the device, what we claim is—

A seeding-roller supporting and carrying the frame of the machine, the shafts of said roller playing in bearings in the free ends of springs, which springs have their other ends rigidly confined to the frame, substantially as described.

In testimony whereof we affix our signatures in presence of two witnesses.

ELIJAH W. McLENDON.
    JOSEPH W. McLENDON.

Witnesses:
 A. R. OXFORD,
 L. S. STRONG.